United States Patent [19]

Gerry

[11] 4,324,209

[45] Apr. 13, 1982

[54] FUEL AND WATER HOMOGENIZER AND VAPORIZER AND METHOD THEREFOR

[76] Inventor: Martin E. Gerry, 13452 Winthrope St., Santa Ana, Calif. 92705

[21] Appl. No.: 153,612

[22] Filed: May 27, 1980

Related U.S. Application Data

[63] Continuation-in-part of Ser. No. 972,953, Dec. 26, 1978, Pat. No. 4,227,817.

[51] Int. Cl.³ .................... F02M 25/04; F02B 47/02
[52] U.S. Cl. .............................. 123/25 B; 123/25 E; 123/25 D; 261/18 A
[58] Field of Search ................ 123/25 R, 25 E, 25 A, 123/25 B, 25 DP, 1 A, 536, 537; 261/18 A, DIG. 66, 36 A

[56] References Cited

U.S. PATENT DOCUMENTS

| | | | |
|---|---|---|---|
| 2,811,146 | 10/1957 | Spillmann | 123/25 A |
| 3,818,876 | 6/1974 | Voogd | 123/25 R |
| 3,968,775 | 7/1976 | Harpman | 123/25 B |
| 4,133,847 | 1/1979 | Feuerman | 123/25 E |

*Primary Examiner*—Charles J. Myhre
*Assistant Examiner*—E. Rollins Cross

[57] ABSTRACT

A fuel and water homogenizing system (300) creates a homogenized fluid of liquid fuel and water within a vessel (310) when the fluid and water within such vessel is agitated by vibrations transduced from electrical energy provided by an AC energy source (400). A predetermined quantity of homogenized fluid is transferred via a conduit (200) to a compartment (24) within a vaporizer (10) to establish a predetermined level in the compartment of the homogenized fluid. To regulate the homogenized fluid level within the compartment (24), another conduit mechanism (305, 306, 307) connects the compartment with the homogenizing vessel pumping back homogenized fluid into the homogenizing vessel when a rise in fluid level within the compartment exceeds a predetermined level. An air stream (32) circulating around an air filter (28) and passing through the air filter within the vaporizer effects a lift, diffusion and vaporization of the homogenized fluid within the compartment, the vaporized and homogenized fluid combining with the air stream to be injected into the throat (65) of an intake manifold (60) of the engine (90). Various ways of preheating the homogenized fluid within the compartment (24) utilize heat from a chamber (50) fed by the exhaust manifold (70) of the engine as well as other heat sources. Such chamber (50) may have a heat insulator (40) between it and the vaporizer for reducing the temperature transferred by the exhaust manifold to a level below the boiling points of the components comprising the homogenized fluid. Other methods of preheating the homogenized fluid include the use of an electrical heater (350) in contact with the vaporizer, or another chamber (250) fed by the liquid coolant of the engine.

14 Claims, 4 Drawing Figures

FUEL AND WATER HOMOGENIZER AND VAPORIZER AND METHOD THEREFOR

CROSS REFERENCE TO RELATED APPLICATION

This application is a continuation-in-part of copending application Ser. No. 972,953 filed Dec. 26, 1978, now U.S. Pat. No. 4,227,817, and incorporated by reference herein.

TECHNICAL FIELD

This invention is in the field of fuel and water homgenizers and a vaporizer for homogenized fuel and water.

This invention utilizes a method and structure for effecting the homogenizing of the fuel and water, feeding the homogenized fluid to a vaporizer and mixing the vaporized homogenized fluid with air for injection into an engine.

BACKGROUND ART

Carburetors which mix fuel and air in predetermined ratios have been used for many years. Such carburetors are mechanically complex and expensive and do not adequately convert liquid fuel to a fine enough vapor. Such carburetors do not possess the ability to vaporize a homogenized fluid of fuel and water and consequently do not provide high level energy fluids to feed an engine.

Fuel injectors have been devised as substitutes for carburetors, but these injectors are complex and even more expensive than curburetors and do not improve upon the energy level of fluid components to be fed to the engine.

Neither the carburetors nor the fuel injectors have the capability of vaporizing a homogenized fluid of fuel and water and hence lose the high energy content of the hydrogen component within the water molecules of the homogenized fluid with attendent loss of energy in the fluid supplied to the engine.

DISCLOSURE OF INVENTION

It is therefore an objective of this invention to provide a vaporizer which diffuses and atomizes a homogenized liquid of fuel and water mixed with air so as to capture an additional high energy source of hydrogen molecules within the water component.

It is another objective of this invention to include a homogenizer that homogenizes liquid fuel and water prior to vaporizing the homogenized fluid.

It is a further objective of this invention to provide a source of heat generated by the engine for further vaporizing the homogenized fluid when the homogenized fluid is residual in the vaporizer.

Accordingly, a system is provided that homogenizes liquid fuel and water, and such homogenized fluid is fed into a vaporizer wherein the fluid is diffused and vaporized by forcing same through a special compartment, and the vaporized fluid is mixed with air to be fed to the intake manifold of the engine.

A heat source, generally obtained from the engine system itself, such as from the exhaust manifold or the engine coolant circulatory subsystem, may be used to further vaporize the already atomized or vaporized homogenized fluid. Such is accomplished by heating the homogenized fluid, generally by heat conduction from a suitable chamber connected to the exhaust manifold or to the coolant subsystem, to pass the heat in the exhaust manifold or the coolant subsystem through the walls or heat conductive structure of the vaporizer.

The diffusion and atomization of the homogenized fluid from its liquid state occurs due the pressure differential between the base of the vaporizer at its lowest elevation and the cover of such vaporizer at its highest elevation level in the presence of an air stream flow into the vaporizer.

The fuel and water is homogenized in a chamber, in predetermined ratio, by virtue of high frequency vibrations of a transducer, fed by a high power AC source, so that the high frequency vibrations integrate the fuel and water molecules.

BEST MODE FOR CARRYING OUT THE INVENTION

Figure 1:
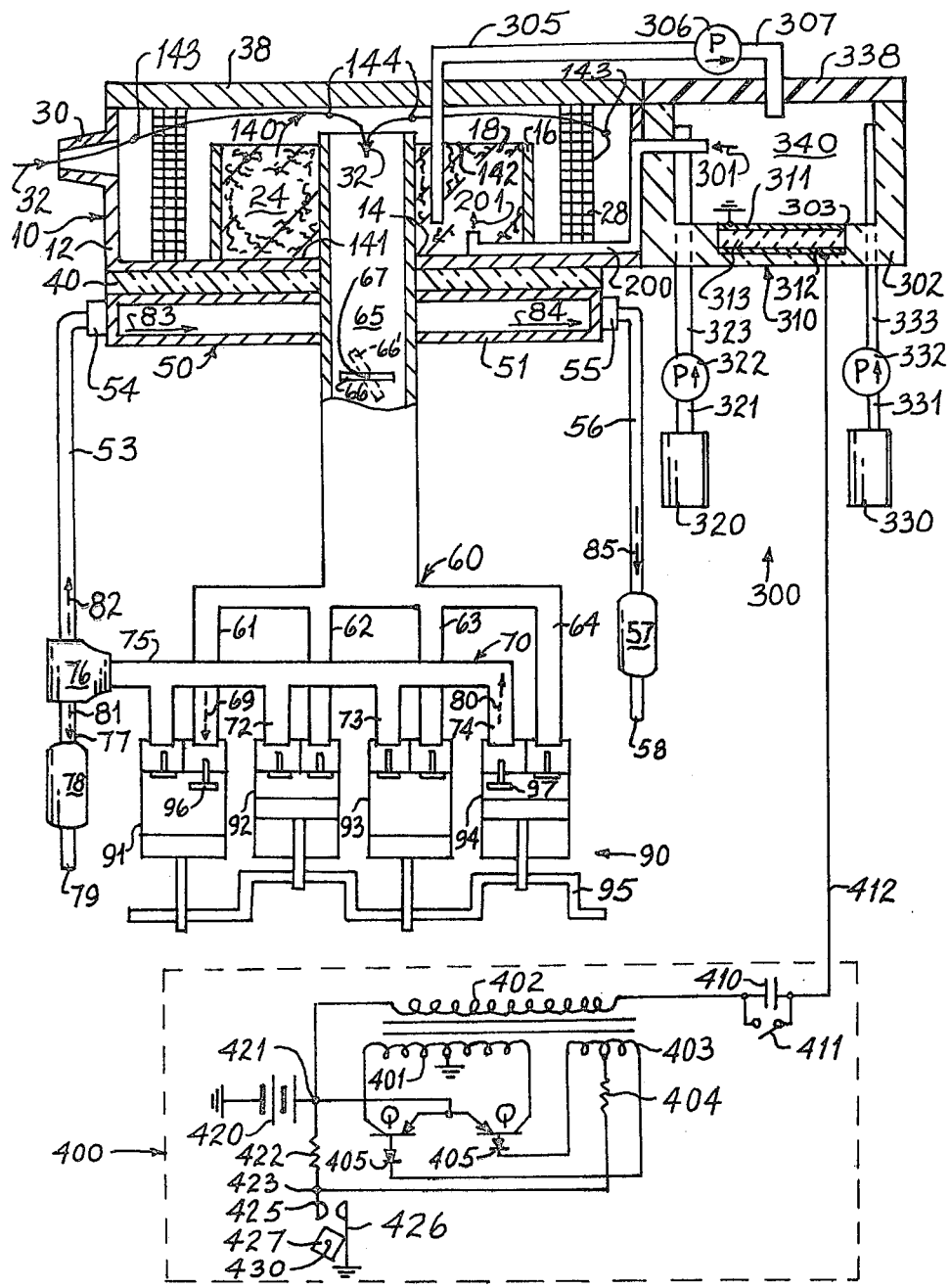
FIG. 1 is a cross-section view of a fuel and water homogenizer, and a vaporizer for the homogenized fluid affixed to the intake manifold of an engine, heat insulation means in cooperation with the vaporizer, and a heating chamber fed by exhaust fluids of the engine. An elevation view of a fuel and water supply feeding such homogenizer, and a partial schematic view of the engine's exhaust and intake manifolds are shown connected to the cylinders of the engine.
Figure 2:
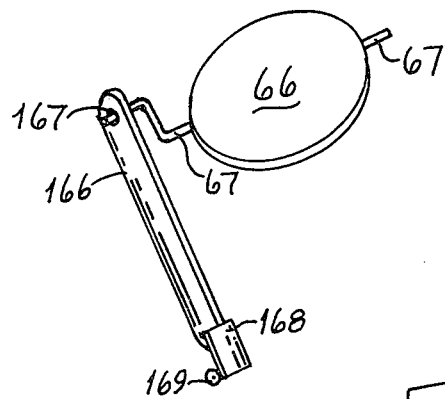
FIG. 2 is a simplified version of an engine throttle mechanism in perspective view, as used to actuate the throttle member installed in the throat of the engine's intake manifold as illustrated in FIG. 1.

Referring to FIGS. 1 and 2, a vaporizer for vaporizing homogenized fuel and water is shown at 10. Vaporizer 10 includes housing 12 which is generally of cylindrical shape though not restricted in any way to such shape. Such housing may be made of non-corrosive metal such as stainless steel, galvanized steel or copper, or may be made of a thermoset plastic material. Housing 12 has a central aperture at 14 for fitting vaporizer 10 to the throat portion 65 of intake manifold 60, throat 65 extending through aperture 14.

Vaporizer 10 includes partition or wall 16 which forms compartment 24 circumjacent throat 65 of intake manifold 60 of the engine. Partition 16 may be made of non-corrosive metal such as stainless steel, galvanized steel or copper, or of a thermoset plastic material.

Partition 16 is an integral part of housing 12, and if housing 12 is metallic, then partition 16 may be welded to the bottom of such housing to avoid fluids in compartment 24 from leaking out of such compartment when fluids are residual within such compartment in their liquid states. Compartment 24 is filled with a fuel diffusing or dispersing substance such as coarse steel wool 18, or any other non-corrosive metallic fuel-diffusing material which permits fuel to be forced therethrough. Non-metallic porous fuel-diffusing material such as spongy type substances or a porous plastic material that does not react with hydrocarbon fuels may also be used as substance 18.

Housing 12 contains a standard air filter 28, commonly used for automobile carburetor air-filtering. Air filter 28 in this configuration is circumjacent compartment 24. Housing 12 has an air intake port 30 for admitting an atmospheric air stream as at 32. Air stream 32 circulates around the outer periphery of air filter 28 and passes through filter 28 to be pulled into throat 65 of the engine's intake manifold 60. Air stream 32 also passes directly through filter 28 in proximity of port 30 to be pulled into throat 65 by intake suction action of one of the engine cylinders. It is understood that air stream 32 will pass through filter 28 along the entire filter 28 periphery although only two such passage points have been graphically illustrated. Housing 12 is fitted with a reasonably air-tight cover 38 of similar material to that used for fabricating housing 12.

An aperture is provided in housing 12 for enabling homogenized fuel and water to be admitted at 201 through conduit 200 into compartment 24, conduit 200 being fed at 301 in chamber 340 of vessel 310. A return and liquid level control conduit 307 passes through cover 338 and is connected to pump 306 which in turn connects to conduit 305, for returning excess homogenized fluid when the fluid level in compartment 24 rises above the opening in conduit 200 at its end within compartment 24. These conduits have idividual seals, not shown, for preventing liquid leakage from within compartment 24 or chamber 340. Such seals may be of the O-ring or equivalent type. If preferred, such conduits, if metallic, can be made an integral part of the housing by welding such conduits to housing 12. If housing 12 and cover 38 are of a thermoset plastic material, impervious to being dissolved by fuel such as gasoline or diesel fuel, then conduits 200 and 305 can be molded to housing 12 and cover 38 respectively, if made of the same plastic material.

Considering the effect upon homogenized fuel and water within compartment 24, the homogenized liquid fuel and water at the base of compartment 24 is dispersed and atomized into small particles flowing through diffusion material 18 in compartment 24, as represented by flow direction arrow 140. An upward pressure is created in compartment 24 by virtue of a vapor pressure differential between the base at 141 of housing 12 and the upper portion at 142 of such compartment 24, the higher pressure being at the 141 location.

Bernoulli's equation defining fluid flow states:

$$\frac{p_1}{w_1} + \frac{v_1^2}{2g} = \frac{p_2}{w_2} + \frac{v_2^2}{2g} = \text{a constant}$$

wherein $p_1/w_1$ and $p_2/w_2$ are discrete static pressure heads, as for example, at two different points 143 and 144 of air stream 32, g is the gravitational accelleration constant, $w_1$ is the specific weight of the atmospheric air at point 143, $w_2$ is the specific weight of the mixture of air and homogenized fuel and water vapor at 144, $v_1$ is the velocity of air stream 32 at 143, $v_2$ is the velocity of air stream 32 at 144, and $v_1^2/2g$ and $v_2^2/2g$ are the discrete velocity pressure heads at points 143 and 144 respectively.

The reason for the upward dispersion and movement of the homogenized fuel and water from location 141 to location 142 may be explained in terms of Bernoulli's equation considering the pressure and velocity terms thereof, since $w_1$, $w_2$ and g terms are constants.

Since the sum of the static and velocity pressure heads is a constant, an increase in velocity at any one point in air stream 32 will cause a decrease in the pressure at that point in order to obey Bernoulli's equation.

A decrease in area along the path of air stream 32, such as a decrease in area along a plane through point 144 with respect to the area along a plane through point 143, will cause an increase in velocity of such air stream 32 at point 143, since the cross-section area within vaporizer 10 through which air stream 32 flows past point 143 is greater than the cross-section area of the flow past point 144. Therefore, any fluid velocity at 143 will be lower than the fluid velocity at 144, and the pressure at 143 will be higher than the pressure at 144.

The pressure at 141 is basically a static pressure and is approximately equal to the pressure at 143. Accordingly, the pressure at 141 will be greater than the pressure at 144, causing the homogenized fluid to be pulled upward within compartment 24 and dispersed and atomized by diffusion material 18 within compartment 24. Direction arrow 140 indicates the upward movement of atomized and homogenized fuel and water which combines with air stream 32 to be pulled into throat 65 by suction action of one of the engine's pistons during any one intake stroke of the Otto cycle. The intake stroke completion is illustrated in cylinder 91 of engine 90.

Hence, homogenized and atomized fuel and water vapors together with air are pulled into the throat 65 of intake manifold 60 past partially open throttle member 66 as at 66' to be injected into cylinder 91 via intake manifold leg 61, as illustrated by suction action 69 when intake valve 96 is open during the intake stroke of the Otto cycle as the piston moves downward in cylinder 91. Such movement creates the pull or suction action upon the homogenized and atomized fuel and water particles mixed with air, to obtain efficient engine performance and reduced fuel consumption. The terms dispersed, diffused or atomized fuel and water or particles thereof indicates the vapor states of such fuel and water or particles thereof.

It should be noted at this time, that although heating chamber 50 and heat insulator 40 have been included in the illustration, neither insulator 40 nor chamber 50 is absolutely required to obtain atomization of the homogenized fuel and water inasmuch as vaporizer 10 will atomize the homogenized fluid, consisting of fuel and water.

However, the addition of chamber 50 coupled to the exhaust manifold 70 will provide a free source of additional heat to raise the temperature of the homogenized fluid within vaporizer 10, and also warm the air flowing therein. With such temperature increase, the homogenized fluid expands, and upon expansion raises its energy level and the energy levels of its particles or vapors passing through compartment 24 to mix with air stream 32 and then be pulled through throat 65 to feed the engine. The greater the energy content of these homogenized fluid particles or vapors, the higher the engine operating efficiency, giving rise to reduced fuel consumption by the engine.

When utilizing chamber 50, it may be necessary to interpose and affix heat insulating means 40 between the base of vaporizer 10 and chamber 50 to prevent the homogenized fluid in compartment 24 from boiling off prematurely.

Water has a boiling point of 100 degrees centigrade, and hydrocarbon fuel such as gasoline, a boiling point of about 150 degrees centigrade. Therefore, heat insulating means 40 will be tailored to maintain the homogenized fluid below the 100 degree centigrade level. A heat insulator at 40 such as a ceramic, may be utilized effectively to reduce the temperature transferred from chamber 50 to the vaporizer.

Chamber 50 is constructed of heat conductive material 51, generally metallic, and is attached to vaporizer 10 either directly or through heat insulating means 40 to obtain heat conduction from chamber 50 to vaporizer 10. Chamber 50 has conduit couplers 54 and 55 at either end of the chamber. Conduit 53 is connected by means of coupler 54 to chamber 50 and conduit 56 is connected to such chamber by means of coupler 55. The other end of conduit 53 is coupled to exhaust manifold 70 at 75 by means of coupling connector 76. Conduit 77 is connected at one end thereof to one port of coupling connector 76 and the other end of conduit 77 is connected to one end of muffler 78, which is normal to an engine, with tailpipe 79 being connected to the other end of muffler 78. When utilizing chamber 50, it will be necessary to attach one end of another muffler 57 at the end of conduit 56, the other end of muffler 57 having a tailpipe 58 connected thereto so as to attenuate audible engine noise.

Hence, the flow of heat from exhaust manifold 70 through chamber 50 may be traced starting at cylinder 94 of engine 90 wherein the piston is shown in the cylinder completing its exhaust stroke, with exhaust valve 97 in open mode to permit the hot exhaust fumes 80 to be pushed out through manifold leg 74 and manifold portion 75 into coupler 76. The flow of hot exhaust fumes can take two paths 81 and 82. Path 81 allows for the passing of exhaust fumes through muffler 78 and tailpipe 79 into the atmosphere. Path 82 passes the exhaust fumes through conduit 53 into chamber 50 at 83, the exhaust fumes flow through the chamber and exit such chamber at 84 into conduit 56 at 85 to be passed through muffler 57 and tailpipe 58 into the atmosphere. When the pistons in the other cylinders 91, 92 or 93 are in their exhaust strokes of the Otto cycle, then hot exhaust fumes, similar to fumes 80, are pushed out through their respective manifold legs 71, 72 or 73.

It should be appreciated that the only purpose of schematically illustrating four cylinders 91, 92, 93 and 94 of engine 90 as well as crankshaft 95 coupled to the piston rods of the pistons associated with such cylinders, was to show each piston at completion state of one of the strokes of the four stroke Otto cycle, so as to see how the intake strokes of the engine create pull upon the homogenized and vaporized fluid and air components passing into the engine, and how the exhaust strokes of the engine effect heat transfer to chamber 50.

Cylinder 91 shows its piston at completion of the intake stroke and shows intake valve 96 in open mode to permit feeding such homogenized fluid mixed with air into cylinder 91 as denoted by flow path arrow 69 when such homogenized vaporized fluid and air pass through throat 65 via partially open throttle member 66 and through intake manifold leg 61. Throttle member 66 has a pivot type pin 67 integral therewith, wherein pivot pin 67 is coupled to a connecting member 166 by virtue of pivot pin 67 extending through aperture 167 at one end of connecting member 166. The other end of connecting member 166 has a foot pedal 168 attached or coupled thereto. Pedal 168 is pivoted at 169 for ease of opening or closing of throttle member 66 so as to control engine speed. Return springs, generally used in conjunction with members 66 and 166 are not illustrated.

When throttle member 66 is in its closed state, obstructing most of the passageway in throat 65, only a small quantity of homogenized and vaporized fluid with air will pass by the periphery of throttle member 66. When throttle member 66 is open as at 66', then a greater quantity of such vaporized homogenized fluid with air will be fed to the engine cylinders in proportion to the opening created in throat 65. The quantity of homogenized and vaporized fluid and air intake feeding the engine cylinders during the intake stroke will therefore be proportional to the increased opening in throat 65 created by opening throttle member 66 by depressing foot pedal 168.

Crankshaft 95 will position the various pistons of this four cylinder engine so that only one of them at any one time is accomplishing one of the four strokes of the Otto cycle. In cylinder 91, the piston is positioned at completion of the intake stroke and the intake valve 96 is open. In cylinder 92 the piston is positioned at completion of the compression stroke and both the intake and exhaust valves are closed. In cylinder 93 the piston is at completion of the power stroke and both the intake and exhaust valves are closed. In cylinder 94 the piston is at completion of the exhaust stroke and the intake valve is closed but the exhaust valve 97 is open to eject the hot exhaust fumes from the cylinder chamber.

It should be noted that a conventional choke member, similar in structure to throttle member 66, has not been included within throat 65. Such choke member is optional and not actually needed with this system. Such choke member is generally actuated by a thermal coil element, which element expands to lengthen the coil element per se to thereby gradually open the choke so as to permit more air from air stream 32 to enter such throat, as the ambient engine temperature builds up with time. During initial starting of the engine, and after a quantity of homogenized fluid and air is injected by depressing accelerator pedal 168 once and permitting pedal 168 to return to its initial position, throttle member 66 is in a horizontal position blocking most of air stream 32 from passing into the engine cylinders, and permitting only a portion of the vaporized homogenized fluid and air to pass between the outer peripheral edges of throttle member 66 and the inner wall of throat 65 when such spacing between the periphery of member 66 and the wall of throat 65 is a minimum. Accordingly, the proper ratio of air and vaporized homogenized fluid will pass through throat 65 into the intake manifold 60, and an additional choke component is not needed.

It should also be noted that although distribution of the homogenized fluid vapor in the presence of an air stream is shown as being made through a common throat 65, thereby providing a shorter travel path for such fluid and air quantities through intake manifold legs 62 and 63 as compared with legs 61 and 64, the imbalance in travel paths is more than offset by the increase in engine efficiency and performance. Therefore, the system herein is a better substitute for a fuel processing system than the complex and expensive fuel injectors, although the fuel injectors resolve the imbalance situation. However, the fuel injectors lack the capability of processing fuel and water to homogenize them prior to being vaporized.

It is obvious from the foregoing, that modifications can be made to the engine structure so as to provide equal path lengths to the several cylinders by grouping the pistons radially, as is done in aircraft engines, and establishing the location of vaporizer 10, chamber 50 and heat insulation means 40 is used, at a central point between the radial engine cylinders. Alternately, the shorter intake manifold legs can be lengthened to accomplish equal path lengths for the homogenized vaporized fluid and air flowing to the several engine cylinders.

The method for producing a homogenized fluid of fuel and water prior to feeding such fluid to vaporizer 10, makes use of a homogenizing sybsystem 300, powered by a high frequency AC source 400. A vessel is provided at 310 which includes a body 302, shown as being made of an electrically insulating material such as ceramic or glass which will not react with hydrocarbon fuels, and may be made of any of a variety of thermoset plastic materials, and a cover as at 338 adapted to body 302. Body 302 has a recess 303 therein circumferential the inner surface of the base thereof for retaining a transducer therein. The transducer may be molded to the electrically insulative substance of body 302 in a manner so as not to inhibit piezoelectric component 313 from vibrating when a voltage of high frequency or high repetition rate is impressed across its conductively coated faces. The material of piezoelectric component 313 may be, for example, either barium titanate, lead zirconate titanate, lead metaniobate or mixtures thereof. Two electrically conductive coatings 311 and 312 on the major faces of member 313 form an electrical capacitor with the material of member 313 therebetween. Member 313 with its electrically conductive coatings form the transducer that converts electrical signals to vibrations.

Although the shape of member 313 is generally circular, such member may be of any shape or form such as being flat to lend itself to being attached or held to the material of body 302 by mechanical means or by a suitable epoxy resin.

A cover at 338, generally made of a plastic or synthetic resin, is used to close the opening in body 302. Such cover may be either screwed or snapped on to the top of body 302. Such cover has an aperture therein for admitting conduit 307. Conduit 307 is the terminal end of a homogenized fluid return means from compartment 24 of vaporizer 10 to chamber 340 of vessel 310. Such fluid return means regulates and maintains the required level of homogenized fluid within vaporizer 10 so that vaporizer 10 uses only such quantity of the homogenized fluid as necessary, and thereby effectively is able to budget homogenized fluid quantities to be fed to the engine. Details of the homogenized fluid return means from the vaporizer to the homogenizer are discussed hereinbelow.

The homogenizing subsystem 300 for homogenizing fuel and water, includes fuel and water supply sources. Vessel 310 is fed by a fuel tank 320 generally made of steel and containing gasoline, diesel fuel or other hydrocarbon compounds in liquid form. Conduit 321 connects tank 320 and fuel pump 322. Fuel pump 322 has a conduit 323 connected thereto which extends through a liquid tight or sealed aperture through body 302 of vessel 310 into homogenizing chamber 340 to a level virtually at the top of chamber 340 near cover 338. Conduits 321 and 323 are of the same inner diameters so that a uniform quantity of fuel may be pumped by pump 322, in direction of the arrow on pump 322, into chamber 340. Such vessel 310 is also fed by a water tank 330 containing water. Conduit 331 connects tank 330 and water pump 332. Water pump 332 has a conduit 333 connected thereto which extends through a liquid tight or sealed aperture through body 302 of vessel 310 into homogenizing chamber 340 to a level virtually at the top of chamber 340 near cover 338, and conduit 333 extends to generally the same level within chamber 340 as conduit 323. Conduits 321, 323, 331 and 333 may be made of plastic material or of a material similar to the substance used for body 302, and as such, conduits 323 and 333 may be molded as part of body 302, if desired.

The normal feed of homogenized fuel and water fluid from chamber 340 of homogenizer vessel 310 to compartment 24 of vaporizer 10, is via conduit 200. Due to the pressure head established by the homogenized fluid level at 301, which also represents the opening in conduit 200 within chamber 340, the homogenized fluid will be fed by aid of gravity into compartment 24, entering compartment 24 at 201 to a predetermined level such as the opening at the end of conduit 200 within compartment 24. The homogenized fluid level will be maintained at such level close to the bottom 141 of compartment 24 so that in the vaporization action, as detailed above, the homogenized fluid will be forced up in compartment 24 through diffusion means 18 to combine with air stream 32 and be injected into throat 65 of intake manifold 60. In the event that it is not possible to physically position homogenizer 310 as illustrated due to inadequate space at a location adjacent vaporizer 10, and it is necessary to drop the homogenizer to a level below the vaporizer, then a pump can be inserted in conduit 200 by cutting conduit 200 into two portions and connecting the pump therebetween. Such pump will lift the homogenized fluid and pass same into compartment 24 as at 201.

In order to maintain a liquid level at the bottom of compartment 24 at the end or opening of conduit 200 within compartment 24, conduit 305, extending through cover 38 into compartment 24, has its end with its opening at about the same level as the opening in conduit 200. Conduit 305 is connected to pump 306 and pump 306 has a conduit 307 connected thereto and extending through cover 338 into chamber 340 of homogenizing vessel 310.

Conduits 305 and 307 have the same inner diameters to help provide uniform flow of the homogenized fluid in direction of the arrow on pump 306 in order to return the homogenized fluid to chamber 340 when the level of such fluid in compartment 24 exceeds the level defined by the opening in conduit 200 within compartment 24. Here too, conduits 305 and 307 may be made of plastic materials, similar materials to those of covers 38 and 338 respectively, or may be molded to such covers or sealed with appropriate sealing means to prevent liquid leakage outside of conduits 305 or 307 of the homegenized fluid.

All pumps used herein are conventional to an automobile, such as being electrically actuated or actuated by the vacuum produced by the engine.

The inner diameters of conduits 323 and 333 will in this situation control the quantity of fuel and water respectively and hence the ratio of fuel to water present within chamber 340. Since the ratio of fuel to water to be homogenized in chamber 340 will be proportional to the ratio of inner cross-section areas of conduits 323 and 333, such ratio will be proportional to the ratio of their diameters squared. Assuming that we wish to have twice as much fuel as water in the homogenized fluid composition, then:

$$D2^2/D1^2 = 2$$

where D2 is the internal diameter of conduit 323 and D1 is the internal diameter of conduit 333. If we arbitrarily select a conduit diameter D1 of 1 centimeter, then diameter D2 will need to be 1.41 centimeters to satisfy the assumed selection. If we further assume that the homogenized fluid is used up by the vaporizer as rapidly as it is fed thereto, then the inner diameters of conduits 305 and 307 will each follow the relationship of:

$$D3^2 = D2^2 + D1^2; \text{or}$$
$$D3 = \sqrt{D2^2 + D1^2}$$

where D3 is the inner diameter for each of conduits 305 and 307. Under the above assumed conditions of conduit diameters, D3 will be 1.73 centimeters.

It is understood that the system described, or one similar to it, can be used to prehomogenize fuel and water and sold by the oil companies to the consumer from their conventional gasoline supply pumps, in view of the fact that homogenized fuel and water by the above process remains homogenized almost indefinitely.

In the illustrated system, the conventional ground symbol is used throughout to indicate the negative potential of battery 420 as well as to indicate a common electrical return path for DC and AC voltages and currents.

AC power generation circuit 400 as illustrated is basically the same circuit as found in U.S. Pat. No. 3,844,287 with minor variations. The circuit herein includes timing means for duty cycling the AC generator herein, and uses PNP transistors instead of the NPN type of transistors illustrated in the referenced patent. Circuit 400 as modified is more reliable by virtue of intermittent pulsing of bias winding 403 through bias resistor 404 in view of the connection of such bias resistor to terminal 423 of a timer comprised of contactors 425 and 426 and cam 427 driven by the engine's distributor shaft as represented at 430. Darlington transistors Q of the PNP type such as type 2N6287 which are used, provide a substantially higher voltage across winding 401, than would non-Darlington type of transistors, and consequently provide a higher voltage across output winding 402 for enabling such voltage across winding 402 to be fed by means of cable 412, either through capacitor 410 when the contacts of switch 411 are open or directly to electrically conductive layer 312 when the contacts of switch 411 are closed. Conductive layer 311 is at ground potential to provide the electrical return path for the transducer when fed by circuit 400. If an increase of effective capacitance is desired, then switch contacts of switch 411 are closed so that capacitor 410 is no longer in series with the effective capacitance presented by the transducer. The positive terminal at 421 of battery 420 is connected so as to power transistors Q, provide a positive DC potential to the emitters of transistors Q and also to provide a positive DC potential to one end of winding 402. Battery 420 provides a positive DC potential to the contactor-cam type timer by means of connection of resistor 422 between junctions 421 and 423 whenever cam 430 drives contactors 425 and 426 to their open and non-cooperating position. Winding 401 has a center tap to provide an electrical return path for oscillation currents circulating in the collector-emitter circuit of the generator by virtue of the center tap of winding 401 being at ground potential. Diodes 405 in series with the bases of transistors Q inhibit base current flow in a direction opposite to normal base biasing current flow, and prevent damage to transistors Q.

The cam-contactor timer used in circuit 400 is conventional in automotive ignition systems, and exemplary of a variety of timers used for ignition purposes such as magnetic pulse timers. These timers may be used to intermittently feed DC power from battery 420 to the AC generator in circuit 400 to start it oscillating, rather than feeding DC power to such generator continuously. This has the advantage of maintaining the generator and its transistors in the ON state about half the operating time, and improving the reliability of the generator by maintaining it cool due to the 50 percent duty cycle of such generator. The timer herein is fed by positive DC from battery 420 through resistor 422 to terminal 423, which terminal 423 is connected to resistor 404 so as to provide a pulsing input to bias winding 403 so as to switch the generator to its ON state whenever contactors 425 and 426 are closed by action of cam 427 that is driven by distributor shaft 430 of engine 90. When the high portion of cam 427 does not cooperate with contactor 426, contactors 425 and 426 are closed and terminal 423 is at ground potential which is the appropriate bias potential to turn transistors Q to their oscillatory or ON states. When a high portion of cam 427 cooperates with contactor 426, as shown in the circuit, contactors 425 and 426 will be open and not cooperate, and consequently terminal 423 will be at positive DC bias potential, turning transistors Q to their OFF states, because PNP type transistors Q will not have bias current flowing through their bases under such conditions and consequently will not have collector current flowing.

It is pointed out as a matter of interest, that terminal 423 can simultaneously be utilized, using the timer illustrated to control another circuit similar to the generator circuit which can be used to supply high ignition energy to electrically activate igniters installed in the engine. This is also true when any other type of timer such as a magnetic pulse type timer is utilized.

It should also be remembered that the intake manifold pull or air suction as illustrated at 69 in intake manifold leg 61 for cylinder 91, is exemplary of what occurs in each of the other cylinders during the intake stroke of the Otto cycle, and it is this intake, suction or vacuum action, as referred to in the automotive industry, which creates an air stream, such as 32, even when the automobile in which the engine is installed is not in motion. It should be appreciated that the intake manifold can be connected to other additional points of vaporizer 10, if desired.

Figure 3:
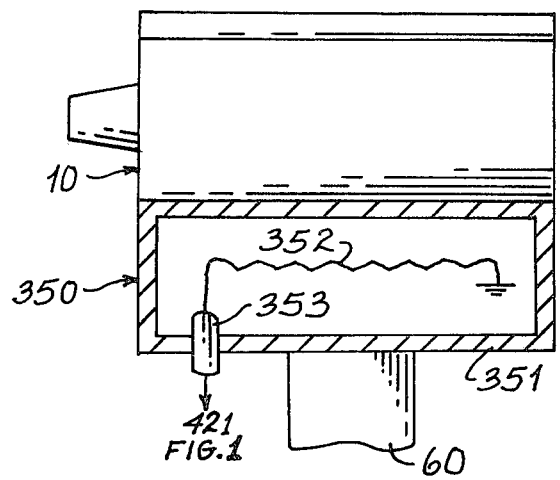
FIG. 3 is a view partially in elevation and partially in cross-section of a method used to provide heat to the vaporizer, alternate to that shown in FIG. 1.

Referring to FIG. 3, electrical heating is provided for vaporizer 10 by means of heating chamber 350. Chamber 350 comprises a thermally conductive enclosure 351 having a resistive element 352 therein. Enclosure 351 is in contact with the enclosure of vaporizer 10 and passes heat created by resistor 352 through enclosure 351 and the vaporizer base to heat the homogenized fluid therein. Resistive element 352 is electrically insulated from enclosure 351. One end of element 352 is at ground potential and the other end is connected through an electrical insulating member 353 to junction 421 of FIG. 1 to obtain battery power to feed resistor 352.

Figure 4:
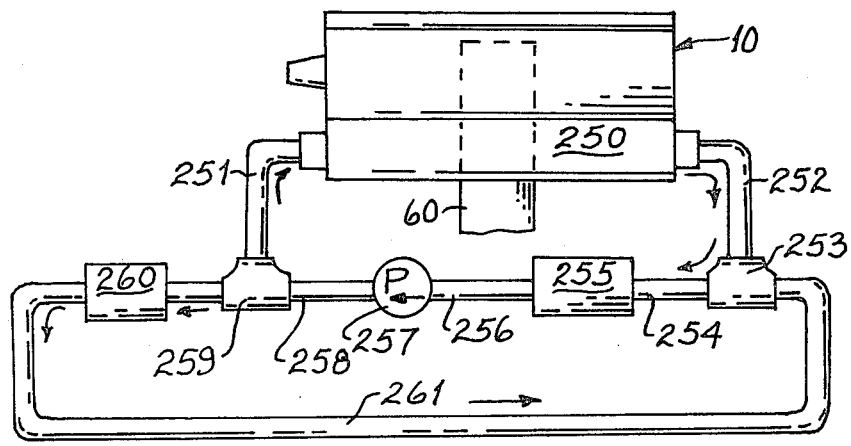
FIG. 4 is an elevation view of part of the system of FIG. 1, wherein liquid coolant fluid of the engine is used to heat the vaporizer and the homogenized fuel and water therein.

Referring to FIG. 4, a system utilizing a cooling liquid from cooling jacket 255 of the engine, which cooling liquid circulates through the engine's radiator 260, may be utilized to raise the homogenized fluid temperature in a similar manner as provided by use of chamber 50 of the FIG. 1 configuration.

Here, it will not be necessary to employ heat insulating means, such as means 40 of FIG. 1, between vaporizer 10 and a fluid retaining chamber 250 because the coolant passing through jacket 255 and radiator 260 is generally maintained at a temperature of about 82 degrees centigrade. Such temperature is below the boiling points of either the fuel or the water used in homogenized state within the vaporizer, and hence the homogenized fluid in vaporizer 10 will be raised to a temperature sufficient to increase the energy content of such fluid within vaporizer 10 in similar but not identical manner as discussed in conjunction with FIG. 1 when chamber 50 was utilized.

Chamber 250, containing a portion of the engine's coolant is in intimate contact with the outer surface of vaporizer 10 so as to pass heat from the coolant in chamber 250 to the homogenized fluid in compartment 24 of vaporizer 10.

All connections made to the engine's intake manifold is identical to that shown in FIG. 1 and need not be repeated herein. However, since the exhaust manifold heat as in FIG. 1 is replaced herein by heat from the engine's liquid coolant, such coolant circulating subsystem is described briefly.

Accordingly, conduit 251 injects the coolant fluid at about 82 degrees centigrade temperature into chamber 250 in direction of the arrow adjacent conduit 251. Such fluid passes through chamber 250 and heat therefrom is conducted through the walls of chamber 250 and the base of vaporizer 10 to heat the homogenized fluid within compartment 24 of vaporizer 10. The fluid from chamber 250 flows out therefrom through conduit 252 in direction of the arrow adjacent conduit 252 into conduit connector 253. Such fluid passes out of connector 253 into conduit 254, coupling connector 253 and cooling jacket 255 of the engine. The cooling fluid passes out of jacket 255 into conduit 256 and through conduit 256 into pump 257. Pump 257 is a coolant pump normally used in an engine's cooling subsystem which permits the coolant to be lifted and passed into the engine's radiator 260 through conduit 258, conduit connector 259 and conduit 261 being connected to radiator 260, thus enabling the recirculation of the coolant fluid back into conduit connector 253 in direction shown by the arrows adjacent conduit 261. At the same time as the coolant fluid passes out of connector 259 into radiator 260, connector 259 permits a portion of the coolant fluid to pass through conduit 251 into chamber 250.

Tapping off a portion of the engine's liquid coolant for use as a temperature source to heat the homogenized fluid in vaporizer 10 is a relatively simple matter. Such tapping off method can be adapted to most engines, except those using air cooling methods, in which case the system of FIG. 1 can be utilized, or the heat dissipated by the air cooling means conducted to the enclosure of vaporizer 10 to heat the homogenized fluid within.

In the entire specification, the term homogenizing, as used herein, defines a process during which molecules of liquid fuel and water are interspersed with each other and would normally remain so interspersed indefinitely.

I claim:

1. A fuel and water homogenizer, and a vaporizer fitted to an engine, said engine developing motive power, comprising the combination of:

homogenizing means for creating a fluid of homogenized liquid fuel and water;
fuel and water retaining means, coupled to said homogenizing means, for providing liquid fuel and water to said homogenizing means; and
vaporizing means, coupled to the homogenizing means, for receiving said fluid, said vaporizing means including a compartment having diffusing means therein for vaporizing said fluid, the vaporized fluid combining with an air stream for injection into said engine.

2. A fuel and water homogenizer, and a vaporizer fitted to an engine, said engine developing motive power, comprising the combination of:

homogenizing means for creating a fluid of homogenized liquid fuel and water, said homogenizing means including a vessel fed by said liquid fuel and water, and transducing means, retained by and located within said vessel, for transducing AC electrical energy to vibrations so as to convert said liquid fuel and water into said homogenized fluid;
fuel and water retaining means, coupled to said homogenizing means, for providing said liquid fuel and water to said homogenizing means; and
vaporizing means, coupled to the homogenizing means, for receiving said fluid, said vaporizing means including a compartment having diffusing means therein for vaporizing said fluid, the vaporized fluid combining with an air stream for injection into said engine.

3. The invention as stated in claim 2, including fluid transfer means, coupling said vaporizing means to said homogenizing means, for feeding said homogenized fluid to said compartment to a predetermined level within said compartment.

4. The invention as stated in claim 2, including fluid return means, coupling said vaporizing means with said homogenizing means, for returning a quantity of said fluid from said compartment to said homogenizing means when the fluid within said compartment rises above a predetermined level.

5. The invention as stated in claim 2, wherein said homogenizing means includes:

AC means, electrically coupled to said transducing means, for powering said transducing means with AC electrical energy.

6. The invention as stated in claim 2, including an air filter adapted to and located within said vaporizing means, said filter enabling filtered air to pass therethrough and mix with said vaporized fluid.

7. The invention as stated in claim 2, wherein said engine includes throttling means for controlling the quantity of said vaporized fluid and air being injected into said engine.

8. The invention as stated in claim 2, including heating means, thermally coupled to said vaporizing means, for raising the temperature level of the homogenized fluid within said compartment.

9. The invention as stated in claim 2, wherein said fuel and water retaining means constitutes a liquid fuel supply source and a water supply source each connected to said vessel and injecting fuel and water into said vessel in predetermined quantities.

10. The invention as stated in claim 5, including timing means, electrically coupled to said AC means, for duty cycling said AC means.

11. The invention as stated in claim 8, wherein said engine has an exhaust manifold and wherein said heating means includes a chamber thermally coupling said vaporizer with said exhaust manifold.

12. The invention as stated in claim 11, including a heat insulator in contact with and interposed between said vaporizing means and chamber.

13. A method for processing liquid fuel and water as a source of energy for an engine which develops motive power, comprising in combination the steps of:
(a) homogenizing liquid fuel with water so as to create a homogenized fluid by transducing AC electrical energy into vibrations and agitating a mixture of said liquid fuel and water by said vibrations, said homogenizing being defined as a process during which molecules of the liquid fuel and water are interspersed with each other and remain so interspersed indefinitely;
(b) diffusing a quantity of said homogenized fluid so as to vaporize said fluid; and
(c) combining said vaporized fluid with air for injection into said engine.

14. A method for processing liquid fuel and water as a source of energy for an engine which develops motive power, comprising in combination the steps of:
homogenizing liquid fuel with water so as to create a homogenized fluid, said homogenized fluid being created by virtue of transducing AC electrical energy into vibrations and agitating a mixture of said liquid fuel and water by said vibrations;
heating a quantity of said homogenized fluid;
diffusing a quantity of said homogenized fluid so as to vaporize said fluid quantity; and
combining said vaporized fluid with air for injection into said engine.

* * * * *